(12) United States Patent
Wang et al.

(10) Patent No.: US 12,601,421 B2
(45) Date of Patent: Apr. 14, 2026

(54) CONNECTING ROD DRIVE MECHANISM FOR WATER DISCHARGE VALVE AND WATER DISCHARGE VALVE HAVING SAID MECHANISM

(71) Applicant: XIAMEN R&T PLUMBING TECHNOLOGY CO., LTD., Xiamen (CN)

(72) Inventors: Zhizhong Wang, Xiamen (CN); Jiawang Bai, Xiamen (CN); Qicheng Hong, Xiamen (CN); Xingdong Wang, Xiamen (CN); Hongwen Zhou, Xiamen (CN)

(73) Assignee: XIAMEN R&T PLUMBING TECHNOLOGY CO., LTD., Xiamen (CN)

( * ) Notice: Subject to any disclaimer, the term of this patent is extended or adjusted under 35 U.S.C. 154(b) by 266 days.

(21) Appl. No.: 17/923,270

(22) PCT Filed: Aug. 10, 2020

(86) PCT No.: PCT/CN2020/108128
§ 371 (c)(1),
(2) Date: Nov. 4, 2022

(87) PCT Pub. No.: WO2021/217948
PCT Pub. Date: Nov. 4, 2021

(65) Prior Publication Data
US 2023/0228344 A1      Jul. 20, 2023

(30) Foreign Application Priority Data

Apr. 30, 2020 (CN) .......................... 202020713269.5

(51) Int. Cl.
*E03D 1/34* (2006.01)
*E03D 3/04* (2006.01)
(Continued)

(52) U.S. Cl.
CPC ................ *F16K 31/52* (2013.01); *E03D 3/04* (2013.01); *F16K 31/047* (2013.01);
(Continued)

(58) Field of Classification Search
CPC ........... E03D 5/02; E03D 5/092; E03D 5/024; E03D 1/34
See application file for complete search history.

(56) References Cited

U.S. PATENT DOCUMENTS 4,312,083 A * 1/1982 Imler ........................ E03D 1/30
137/410
6,308,348 B1 * 10/2001 Liou ........................ E03D 1/142
4/388

(Continued)

FOREIGN PATENT DOCUMENTS

CN          203846584 U  *  9/2014

*Primary Examiner* — Erin Deery

(74) *Attorney, Agent, or Firm* — Nitin Kaushik

(57) ABSTRACT

A connecting rod drive mechanism for a water discharge valve, comprises a base, a first stage connecting rod, and a last stage connecting rod, the first stage connecting rod and the last stage connecting rod are movably arranged on the base, a drive part, a turning part, and a transmission part are provided on the last stage connecting rod, the drive part cooperates in transmission with an initiation assembly of the water discharge valve, the transmission part cooperates in transmission with the first stage connecting rod, the turning part forms a relative turning connection with the base, the transmission part is located between the drive part and the turning part, and the first stage connecting rod is driven so as to impel the last stage connecting rod, causing a drive part of the last stage connecting rod to drive the initiation assembly of the water discharge valve.

17 Claims, 10 Drawing Sheets

(51) Int. Cl.
  *E03D 5/02*    (2006.01)
  *E03D 5/10*    (2006.01)
  *F16K 31/04*   (2006.01)
  *F16K 31/163*  (2006.01)
  *F16K 31/52*   (2006.01)

(52) U.S. Cl.
  CPC .............. *F16K 31/163* (2013.01); *E03D 1/34*
    (2013.01); *E03D 5/02* (2013.01); *E03D 5/10*
                   (2013.01)

(56)      References Cited

U.S. PATENT DOCUMENTS

2005/0278842  A1* 12/2005 Yen ........................... E03D 5/10
                       4/406
2009/0211009  A1*  8/2009 Yen ......................... E03D 5/024
                       4/407

* cited by examiner

CONNECTING ROD DRIVE MECHANISM FOR WATER DISCHARGE VALVE AND WATER DISCHARGE VALVE HAVING SAID MECHANISM

BACKGROUND OF THE INVENTION

1. Technical Field

The present utility model relates to the technical field of water discharge valves, in particular to a connecting rod drive mechanism for a water discharge valve and a water discharge valve having the said mechanism.

2. Description of Related Art

For a drive mechanism of an existing water discharge valve used to control a toilet tank to discharge water, a press rod is generally adopted to directly press a key on an upper cover of the water discharge valve, in which case the pressing travel of the press rod needs to be larger than the moving travel of the key so as to ensure that the key can be driven in place. Such drive mechanism requires a large moving travel of the press rod, and the pressing feel is not good; besides, such drive mechanism requires the height of the water discharge valve is higher, which is not conducive to lower-level design of the water discharge valve. In addition, the drive mechanism usually needs to be arranged above the key, and position design is not flexible enough.

BRIEF SUMMARY OF THE INVENTION

To solve the above problems, the present utility model aims to provide a connecting rod drive mechanism for a water discharge valve and a water discharge valve having the said mechanism, which can amplify drive travel and can allow for more flexible positioning of a drive mechanism.

To achieve the above purpose, the technical scheme of the present utility model is as follows. A connecting rod drive mechanism for a water discharge valve comprises a base, a first stage connecting rod, and a last stage connecting rod, the first stage connecting rod and the last stage connecting rod are movably arranged on the base, a drive part, a turning part, and a transmission part are provided on the last stage connecting rod, the drive part cooperates in transmission with an initiation assembly of the water discharge valve, the transmission part cooperates in transmission with the first stage connecting rod, the turning part forms a relative turning connection with the base, the turning part is located between the drive part and the transmission part, or the transmission part is located between the drive part and the turning part, and the first stage connecting rod is driven so as to impel the last stage connecting rod, causing a drive part of the last stage connecting rod to drive the initiation assembly of the water discharge valve to be opened and discharge water.

Preferably, the mechanism further comprises an intermediate stage connecting rod, a first end of the intermediate stage connecting rod forms a turning connection with the base, the turning part forms a turning connection with a second end of the intermediate stage connecting rod, the first stage connecting rod is slidably arranged on the base, and the transmission part is located between the drive part and the turning part and forms a turning connection with the first stage connecting rod. The base, the first stage connecting rod, the intermediate stage connecting rod and the last stage connecting rod form a four-bar mechanism.

Preferably, the transmission part is located between the drive part and the turning part and forms a turning connection with the first stage connecting rod, the transmission part is provided with an elongated hole, and an end of the first stage connecting rod is provided with a rotating shaft which rotates and slides in the elongated hole; or, the end of the first stage connecting rod is provided with an elongated hole, and the transmission part is provided with a rotating shaft which rotates and slides in the elongated hole.

Preferably, the base is detachably fixed on one side of the water discharge valve.

Preferably, the base is provided with a fixing part fixedly connected with the water discharge valve, the fixing part has an adjusting structure, and the fixing part is adjustably fixed on the water discharge valve through the adjusting structure.

Preferably, the base is fixed on an overflow pipe of the water discharge valve or a switch body of the water discharge valve or a valve body of the water discharge valve.

Preferably, the mechanism further comprises a drive unit, and the drive unit is linked with the first stage connecting rod.

Preferably, the drive unit adopts motor driving.

Preferably, the drive unit adopts fluid driving, and comprises a fluid driving assembly, and the fluid driving assembly comprises a pump, a cylinder/elastic bladder and a piston. When the pump is turned on, the pump delivers working fluid to the cylinder/elastic bladder to drive the piston, which in turn drives the first stage connecting rod.

In addition, the present utility model also provides a water discharge valve, which comprises an initiation assembly for controlling the opening and closing of the water discharge valve, and any one of the above-mentioned connecting rod drive mechanisms for a water discharge valve. The connecting rod drive mechanism drives the initiation assembly to control the water discharge valve to be opened and discharge water, and the base is arranged on one side of the initiation assembly of the water discharge valve.

Compared with the prior art, the present utility model has the beneficial effects that:

1. according to the connecting rod drive mechanism for a water discharge valve of the present utility model, the drive part cooperates in transmission with the initiation assembly of the water discharge valve, the transmission part cooperates in transmission with the first stage connecting rod, and the turning part forms a relative turning connection with the base; in this way, the connecting rod drive mechanism is able to amplify drive travel, can allow for more flexible positioning of a drive mechanism, and there is relatively low eccentric force during the process of driving, which is beneficial for extending assembly life;

2. the base, the first stage connecting rod, the intermediate stage connecting rod and the last stage connecting rod form a four-bar mechanism which is simple and compact in structure;

3. the transmission part is located between the drive part and the turning part and forms a turning connection with the first stage connecting rod, and the transmission part is in rotating and sliding fit with the end of the first stage connecting rod through the elongated hole and the rotating shaft, thus realizing driving connection featuring a simple structure and a reliable function;

4. the base is detachably fixed on the water discharge valve, which allows the position of the connecting rod drive mechanism to be adjusted or replaced conveniently; and 5. the drive unit adopts a motor or fluid driving assembly for driving, which realizes a simple structure.

Figure 1:
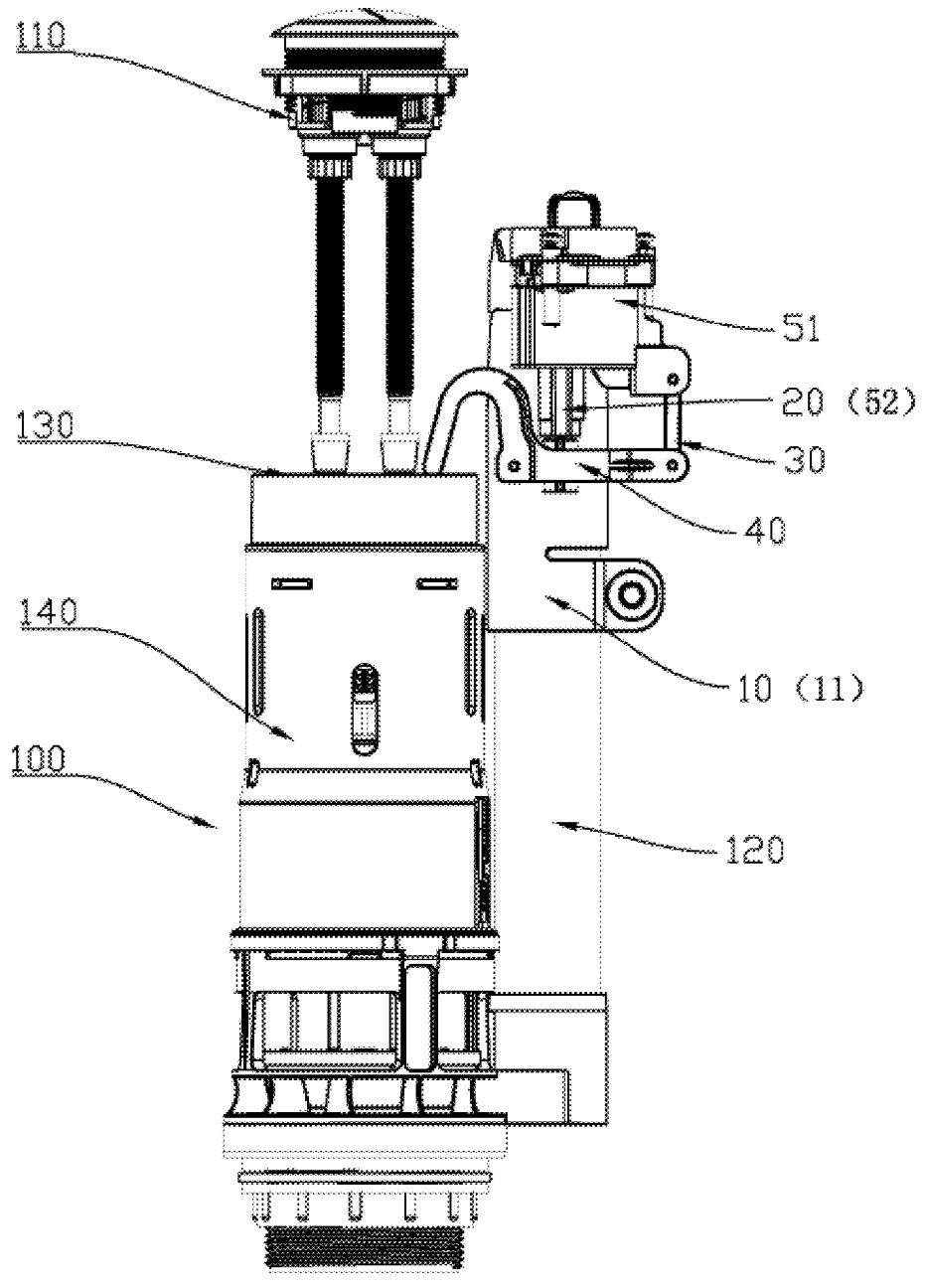
FIG. 1 is a structural diagram of a connecting rod drive mechanism for a water discharge valve according to a first embodiment of the utility model installed on a water discharge valve.
Figure 2:
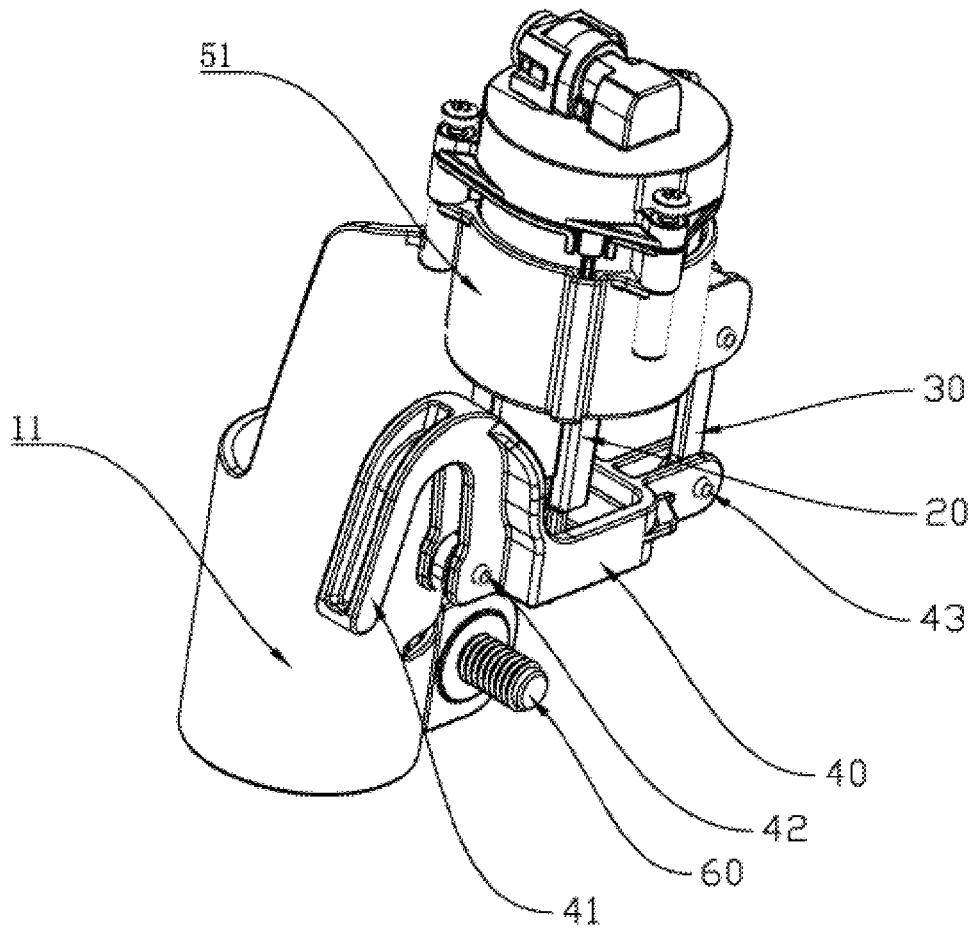
FIG. 2 is a perspective view of a connecting rod drive mechanism for a water discharge valve according to a first embodiment of the utility model in an assembled state.
Figure 3:
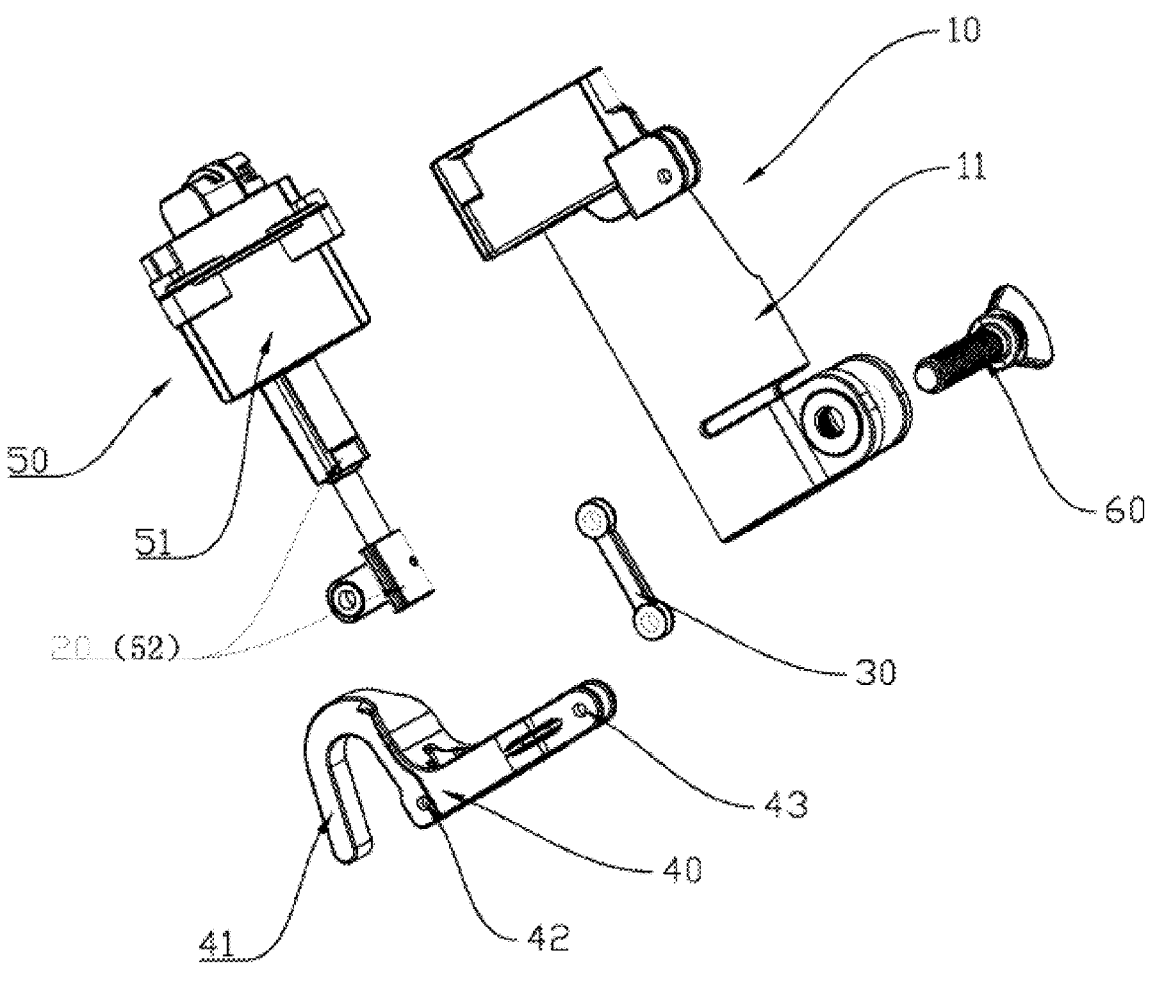
FIG. 3 is an exploded view of a connecting rod drive mechanism for a water discharge valve according to a first embodiment of the utility model.

REFERENCE NUMBERS IN THE DRAWINGS base 10; fixing sleeve 11; first stage connecting rod 20; rotating shaft 21; intermediate stage connecting rod 30; last stage connecting rod 40; drive part 41; transmission part 42; elongated hole 421; turning part 43; drive unit 50; cylinder 51; piston 52; screw assembly 60; water discharge valve 100; switch body 110; overflow pipe 120; key 130; valve body 140 of water discharge valve; valve element 150.

DETAILED DESCRIPTION OF THE INVENTION

In order to explain the technical scheme of the embodiment of the utility model more clearly, the utility model will be further explained below with reference to the attached drawings. The attached drawings in the following description are only some embodiments of the utility model. For those of ordinary skill in the art, other drawings can be obtained according to these drawings without paying creative labor.

As shown in FIGS. 1-5, a connecting rod drive mechanism for a water discharge valve according to a first embodiment of the utility model comprises a base 10, a first stage connecting rod 20, an intermediate stage connecting rod 30 and a last stage connecting rod 40. The first stage connecting rod 20 and the last stage connecting rod 40 are movably arranged on the base 10. A first end of the intermediate stage connecting rod 30 is in rotating fit with the base 10. A drive part 41, a transmission part 42 and a turning part 43 are provided on the last stage connecting rod 40. The transmission part 42 is located between the drive part 41 and the turning part 43, that is, the drive part 41 and the turning part 43 are located on two sides of the transmission part 42 respectively. The drive part 41 cooperates in transmission with an initiation assembly of the water discharge valve, the transmission part 42 forms a turning connection with the first stage connecting rod 20, the turning part 43 forms a turning connection with a second end of the intermediate stage connecting rod 30, and the turning part 43 forms a relative turning connection with the base 10 through the intermediate stage connecting rod 30. The first stage connecting rod 20 is driven so as to impel the last stage connecting rod 40, causing a drive part 41 of the last stage connecting rod 40 to drive the initiation assembly of the water discharge valve 100 to be opened and discharge water. In this embodiment, the initiation assembly comprises a key 130 arranged on the top of a valve body 140, and the drive part 41 presses and drives the key 130 so as to control the water discharge valve 100 to be opened and discharge water.

Figure 4:
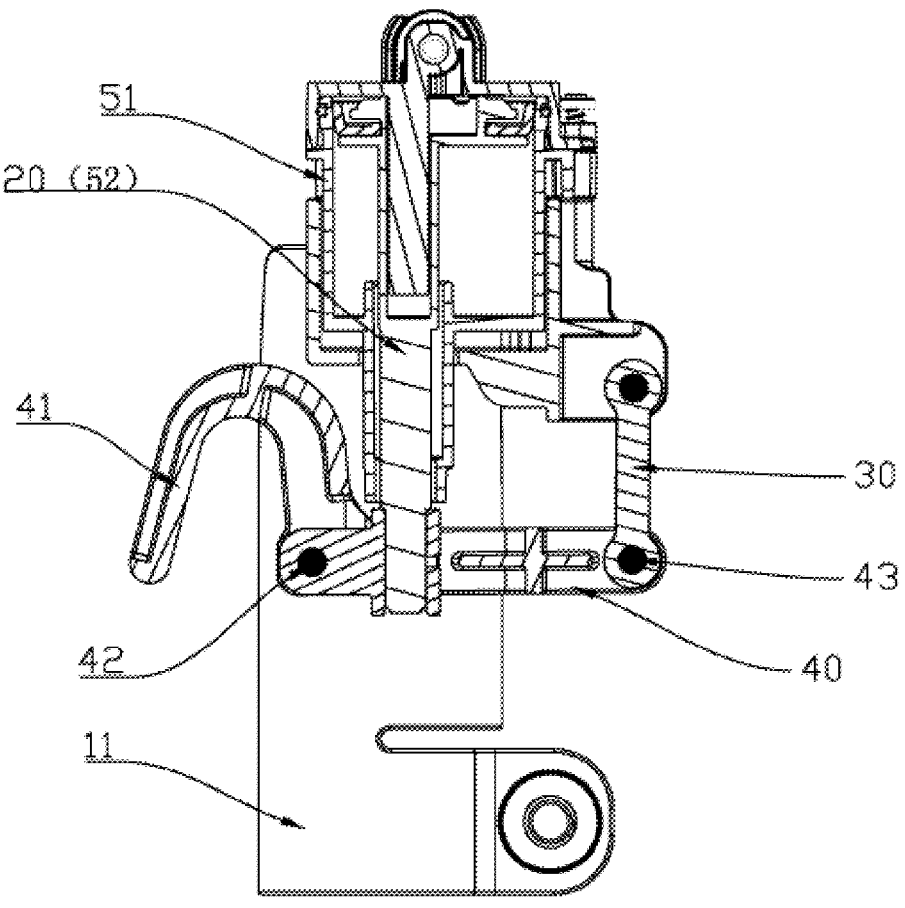
FIG. 4 is a sectional view of a connecting rod drive mechanism for a water discharge valve according to a first embodiment of the utility model in an assembled state, in which case a drive unit is in an initial state.
Figure 5:
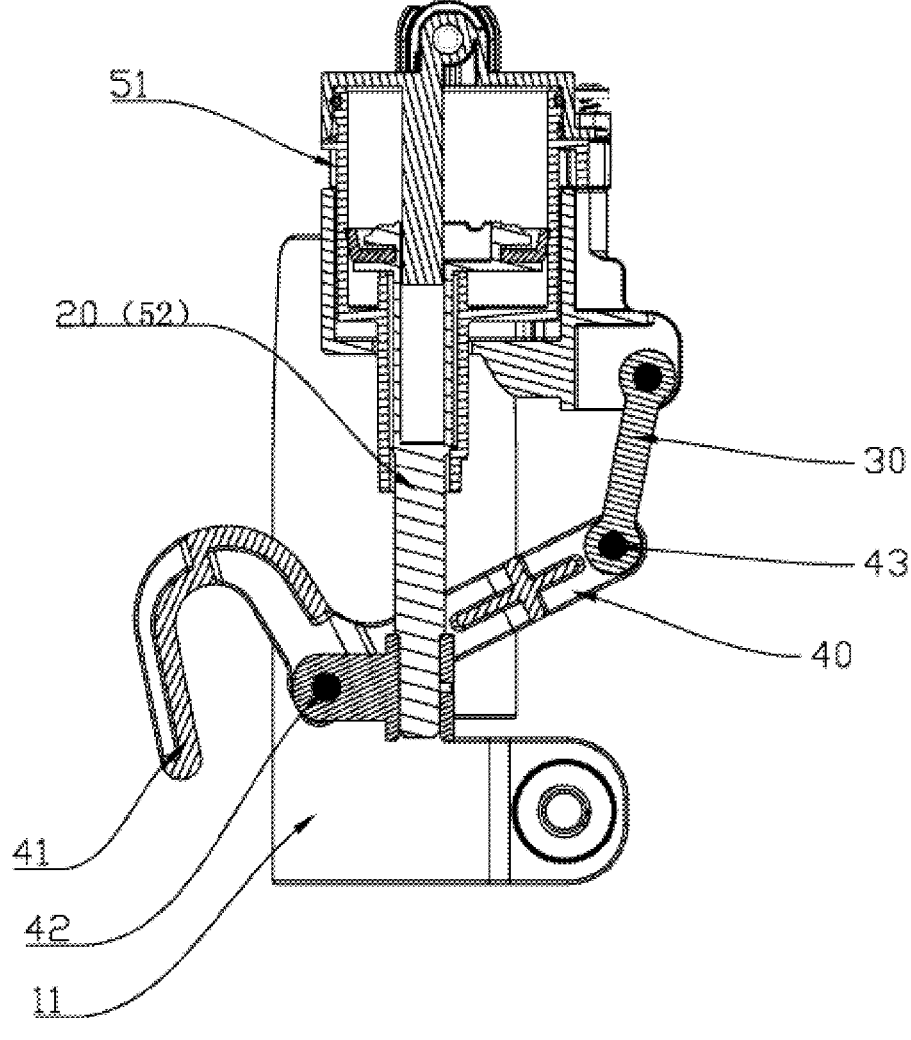
FIG. 5 is a sectional view of a connecting rod drive mechanism for a water discharge valve according to a first embodiment of the utility model in an assembled state, in which case a drive unit is in a driving state.

As shown in FIGS. 4 and 5, in this embodiment, the first stage connecting rod 20 is slidably arranged on the base 10, and the base 10, the first stage connecting rod 20, the intermediate stage connecting rod 30 and the last stage connecting rod 40 form a four-bar mechanism.

The base 10 is arranged on one side of the key 130 of the initiation assembly of the water discharge valve. The base 10 may be fixed on an overflow pipe 120 of the water discharge valve 100, a switch body 110 of the water discharge valve 100, a valve body 140 of the water discharge valve or other parts of the water discharge valve. As shown in FIG. 1, in this embodiment, the base 10 is fixed on the overflow pipe 120 of the water discharge valve 100.

Specifically, in this embodiment, the base 10 is provided with a fixing sleeve 11 fixedly connected with the overflow pipe 120, and the fixing sleeve 11 can be directly sleeved outside the overflow pipe 120. Preferably, an adjusting structure (not shown) can also be arranged on the fixing sleeve 11, and the fixing sleeve 11 is adjustably fixed on the overflow pipe 120 through the adjusting structure. For example, the inner diameter of the fixing sleeve 11 is set to be adjustable, so that the fixing sleeve 11 can be adjusted according to the diameter of the overflow pipe 120, so as to match overflow pipes 120 with different diameters, realizing better compatibility. In addition, the fixing sleeve 11 of this embodiment is detachably fixed on the water discharge valve 100 through a screw assembly 60, which allows the position of the connecting rod drive mechanism to be adjusted or replaced conveniently.

In this embodiment, the mechanism further comprises a drive unit 50, and the drive unit 50 is linked with the first stage connecting rod 20. Specifically, the drive unit 50 adopts fluid driving, and comprises a fluid driving assembly. The fluid driving assembly comprises a pump (not shown), a cylinder 51, and a piston 52. When the pump is turned on, working fluid is delivered to the cylinder 51 to drive the piston 52, which in turn drives the first stage connecting rod 20. In this embodiment, the piston 52 and the first stage connecting rod 20 are integrally formed, of course, they can also be separately formed and fixed together, and the fluid may be water or air. It can be understood that the cylinder 51 may also be replaced by an elastic bladder (not shown), and the piston 52 is driven to be in linkage fit the elastic bladder. Of course, the drive unit 50 may also adopt motor driving or mechanical key driving, which will not be listed here.

The working process of this embodiment is as follows.

As shown in FIG. 4, the drive unit 50 is in an initial state, the pump is not turned on, the cylinder 51 does not contain any fluid, and the piston 52 retracts into the cylinder 51.

As shown in FIG. 5, when the drive unit 50 is started, the pump is turned on to deliver working fluid to the cylinder 51 to drive the piston 52, which in turn drives the first stage connecting rod 20 to move in the downward direction of FIG. 5, and the first stage connecting rod 20 drives the last stage connecting rod 40 to rotate relative to the base 10, so that the drive part 41 of the last stage connecting rod 40 moves downward, thereby pressing the key 130 of the initiation assembly of the water discharge valve 100, so as to open the water discharge valve to discharge water.

In an alternative embodiment, the end of the first stage connecting rod 20 may not be connected with the transmission part 42, but in abutting fit with the transmission part 42 directly. When moving downward, the first stage connecting rod 20 abuts against the transmission part 42 of the last stage connecting rod 40 to drive the last stage connecting rod 40 to rotate relative to the base 10. In this case, the last stage connecting rod 40 may recover the original state by means of an additional elastic member after being driven, such as a torsion spring.

Figure 6:
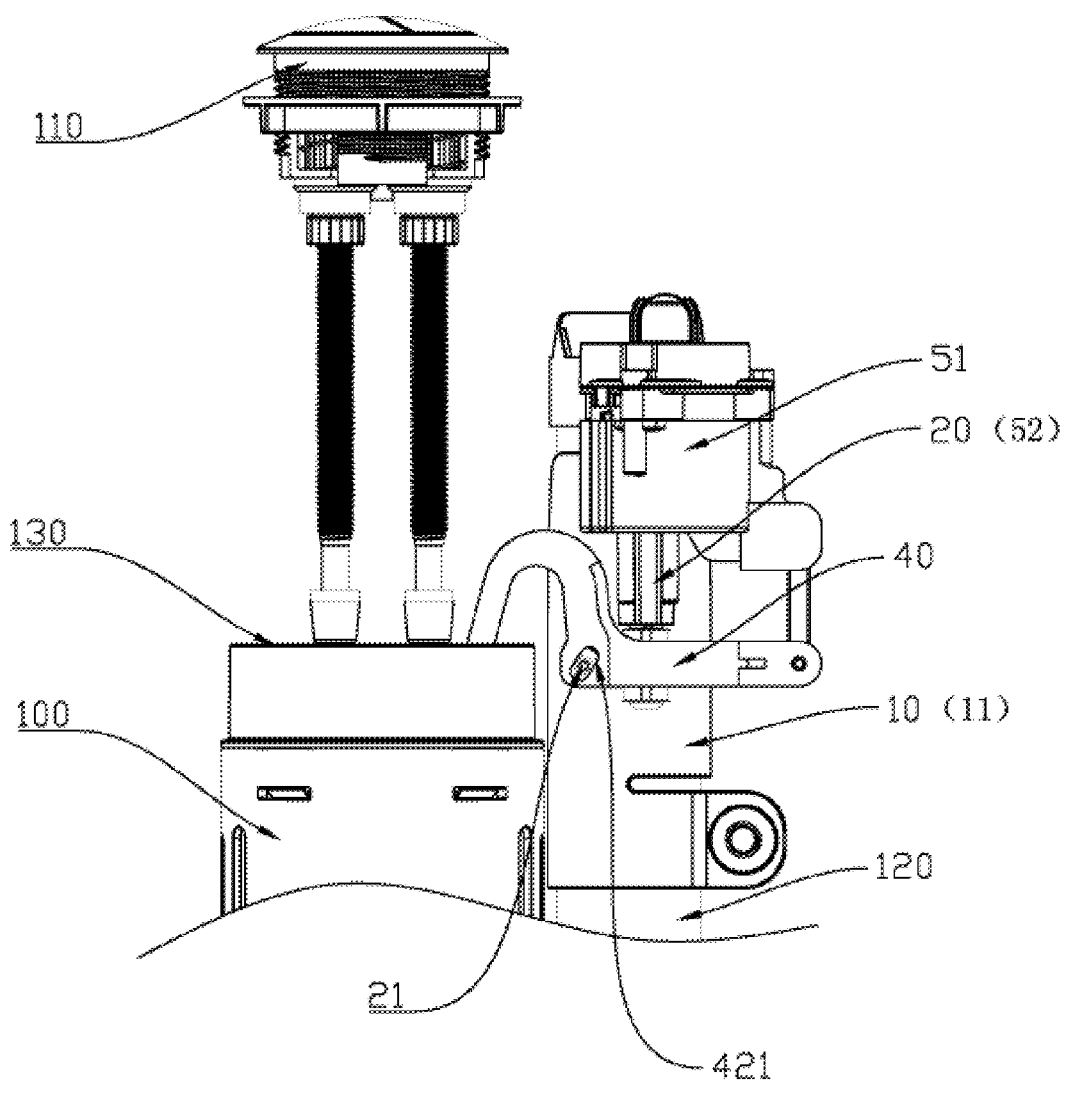
FIG. 6 is a partial structural diagram of a connecting rod drive mechanism for a water discharge valve according to a second embodiment of the utility model installed on a water discharge valve, in which case a drive unit is in an initial state.
Figure 7:
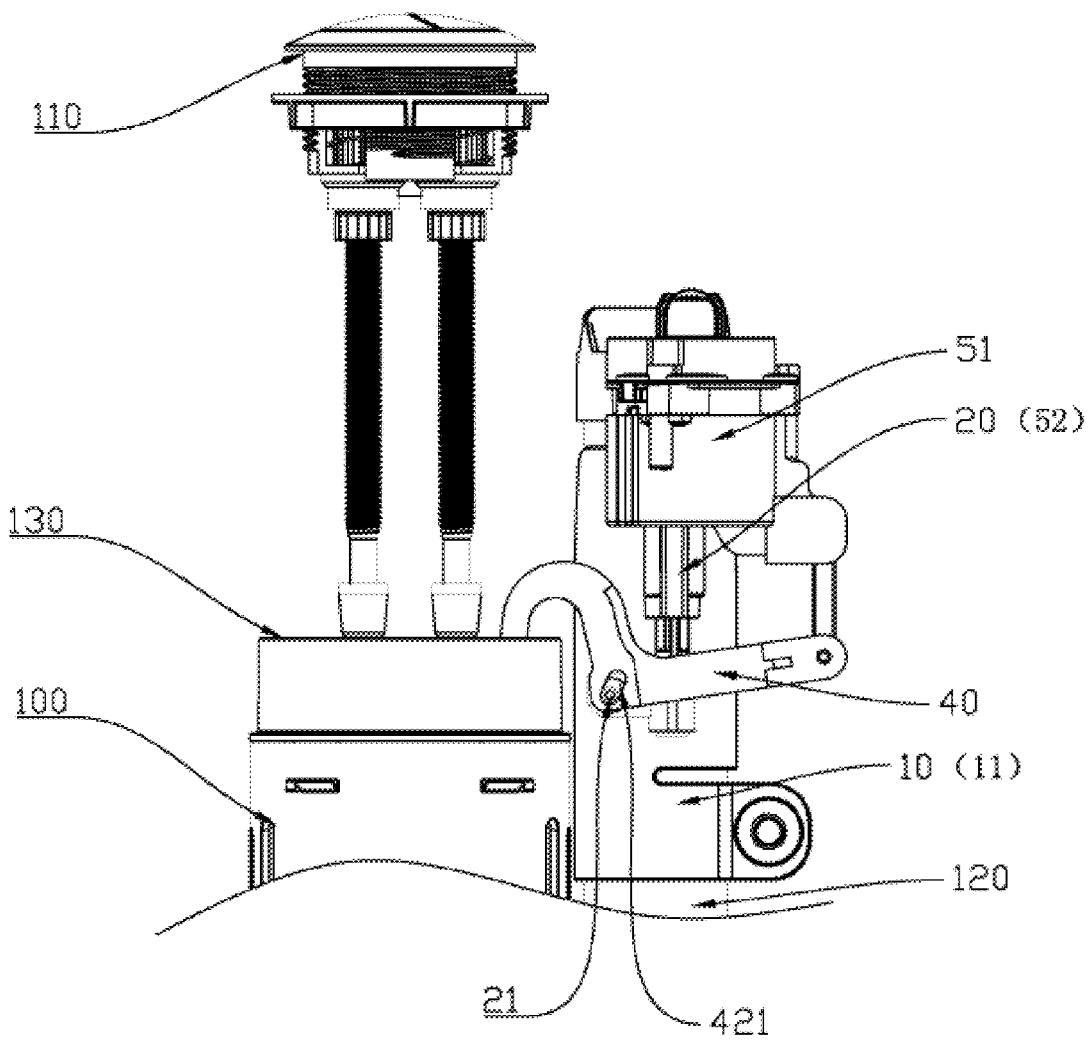
FIG. 7 is a partial structural diagram of a connecting rod drive mechanism for a water discharge valve according to a second embodiment of the utility model installed on a water discharge valve, in which case a drive unit is in a driving state.
Figure 8:
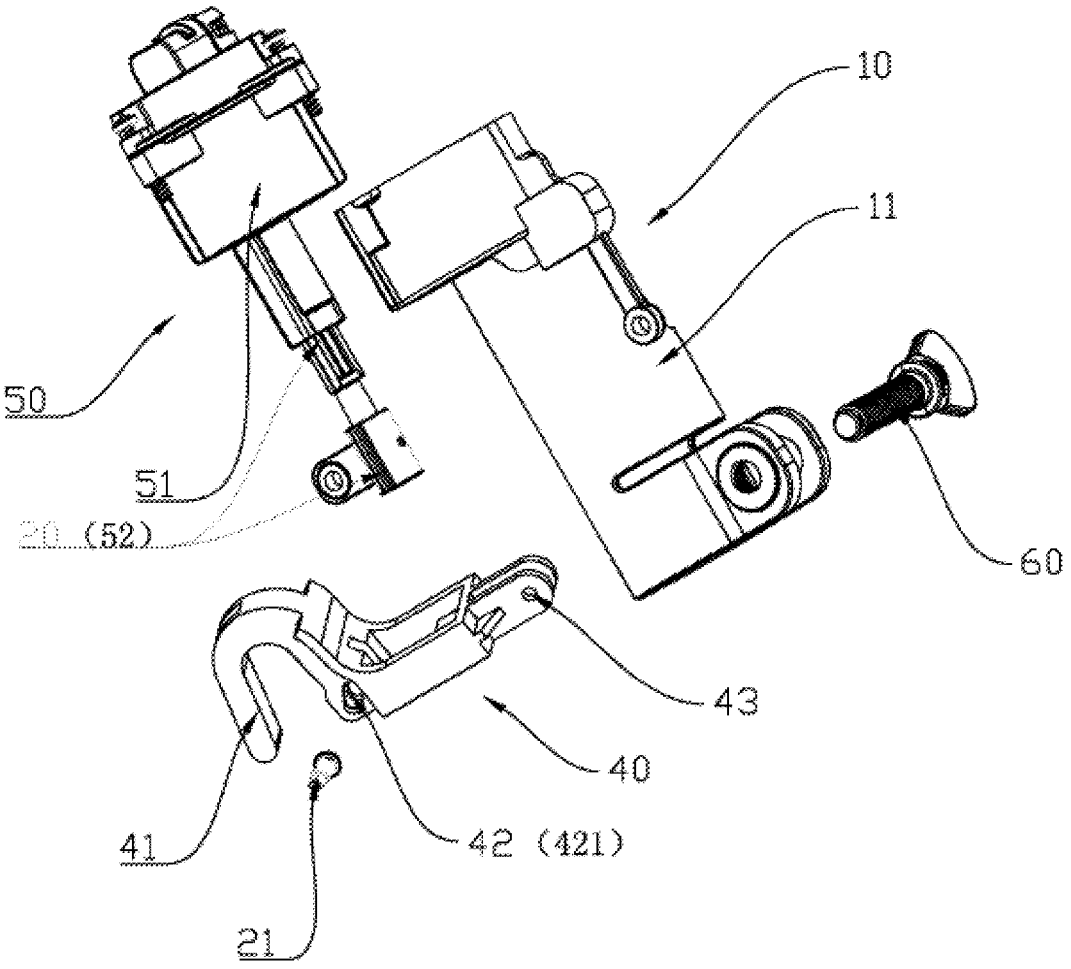
FIG. 8 is an exploded view of a connecting rod drive mechanism for a water discharge valve according to a second embodiment of the utility model.

As shown in FIGS. 6-8, a connecting rod drive mechanism for a water discharge valve according to a second embodiment of the utility model is basically the same as the above-mentioned embodiment, except that in this embodiment, the intermediate stage connecting rod 30 is omitted, and the turning part 43 of the last stage connecting rod 40 forms a turning connection with the base 10 directly. In addition, the transmission part 42 is provided with an elongated hole 421, and the end of the first stage connecting rod 20 is provided with a rotating shaft 21, which rotates and slides in the elongated hole 421. Of course, it may also be that an elongated hole 421 is formed in the end of the first stage connecting rod 20, a rotating shaft 21 is arranged on the transmission part 42, and the rotating shaft 21 rotates and slides in the elongated hole 421.

The rest of the structure and working principle of this embodiment are similar to those of the above-mentioned embodiment, and will not be repeated here.

Figure 9:
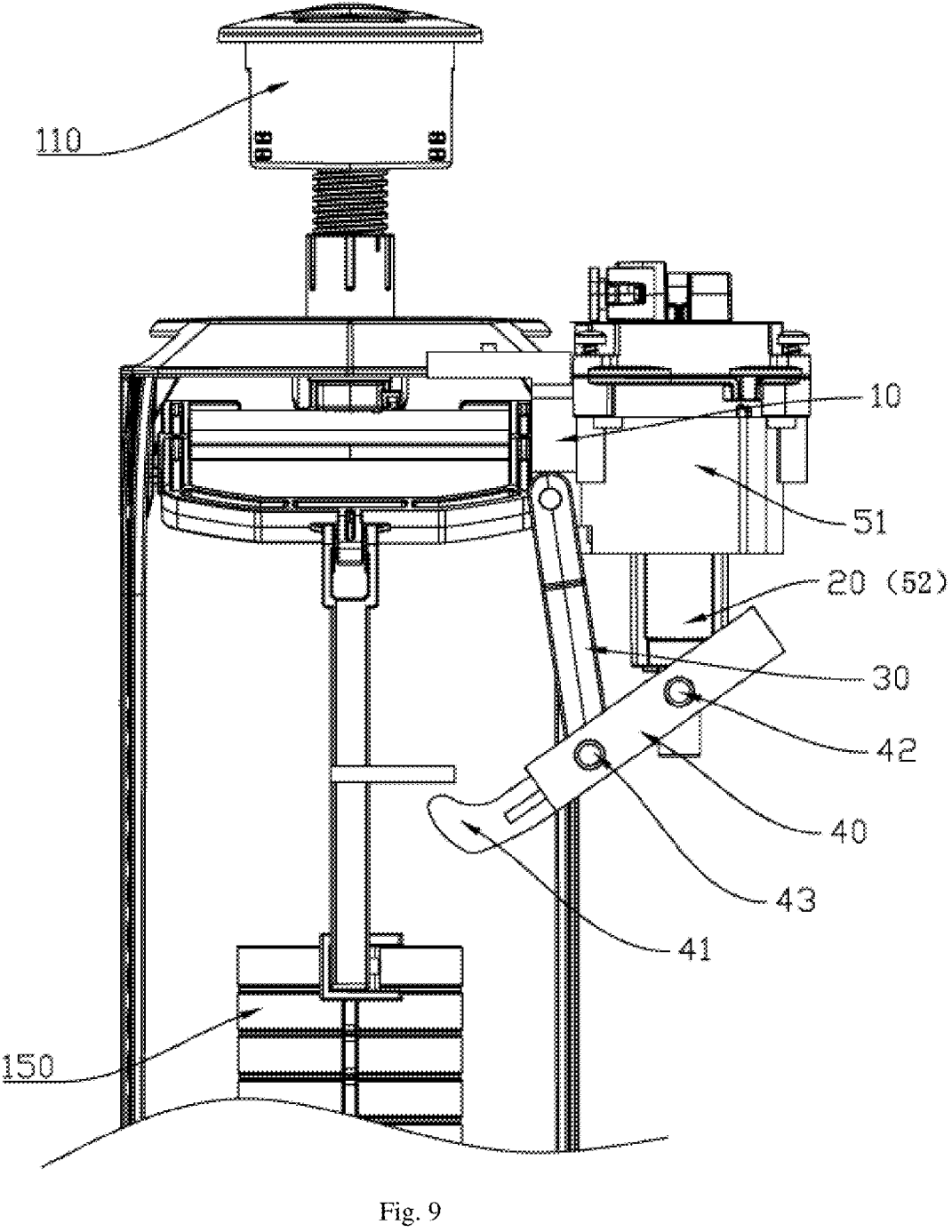
FIG. 9 is a partial structural diagram of a connecting rod drive mechanism for a water discharge valve according to a third embodiment of the utility model installed on a water discharge valve, in which case a drive unit is in an initial state.
Figure 10:
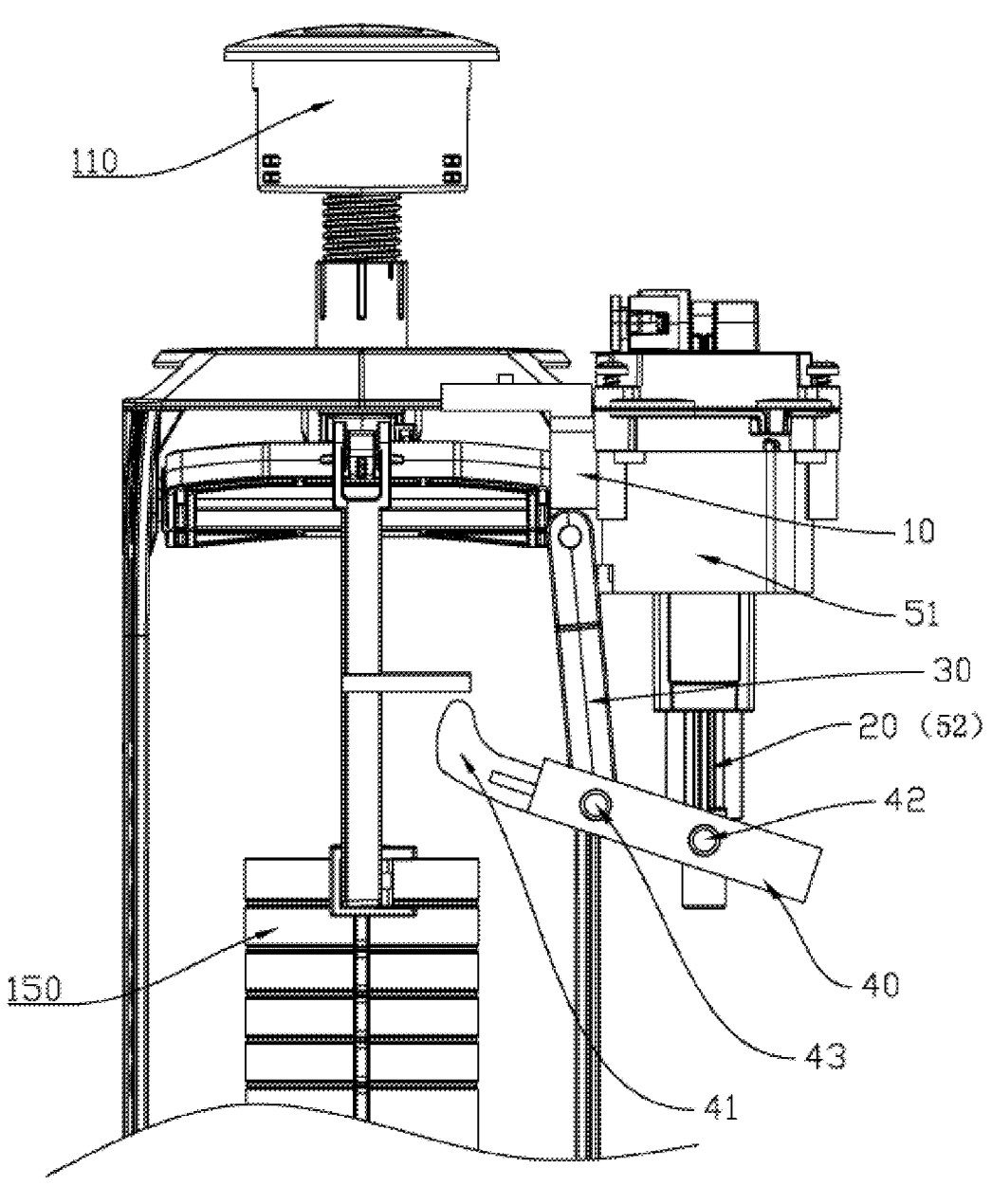
FIG. 10 is a partial structural diagram of a connecting rod drive mechanism for a water discharge valve according to a third embodiment of the utility model installed on a water discharge valve, in which case a drive unit is in a driving state.

As shown in FIGS. 9 and 10, a connecting rod drive mechanism for a water discharge valve according to a third embodiment of the utility model is basically the same as the first embodiment, except that in this embodiment, the turning part 43 is located between the drive part 41 and the transmission part 42, the drive part 41 is in linkage fit with a valve element 150 of the initiation assembly of the water discharge valve, and the drive part 41 directly pulls the valve element 150 upward after being driven, so that the valve element 150 opens a discharge port of the water discharge valve to discharge water.

In addition, the utility model also provides a water discharge valve 100, which comprises an initiation assembly for controlling the opening and closing of the water discharge valve 100, and any one of the above-mentioned connecting rod drive mechanisms for a water discharge valve 100, and the connecting rod drive mechanism drives the initiation assembly to control the water discharge valve 100 to be opened and discharge water.

Although the utility model has been specifically shown and described in connection with preferred implementations, those skilled in the art should understand that all kinds of changes in form and details of the utility model are within the scope of protection of the utility model without departing from the spirit and scope of the utility model defined by the appended claims.

What is claimed is:

1. A connecting rod drive mechanism for a water discharge valve, comprising a base, a first stage connecting rod, and a last stage connecting rod, wherein the first stage connecting rod and the last stage connecting rod are movably arranged on the base, a drive part, a turning part, and a transmission part are provided on the last stage connecting rod, the drive part cooperates in transmission with an initiation assembly of the water discharge valve, the transmission part cooperates in transmission with the first stage connecting rod, the turning part forms a relative turning connection with the base, the transmission part is located between the drive part and the turning part, and the first stage connecting rod is driven so as to impel the last stage connecting rod, causing a drive part of the last stage connecting rod to drive the initiation assembly of the water discharge valve to be opened and discharge water, wherein the mechanism further comprises an intermediate stage connecting rod, a first end of the intermediate stage connecting rod forms a turning connection with the base, the turning part forms a turning connection with a second end of the intermediate stage connecting rod, the first stage connecting rod is slidably arranged on the base, and the transmission part is located between the drive part and the turning part and forms a turning connection with the first stage connecting rod; and the base, the first stage connecting rod, the intermediate stage connecting rod and the last stage connecting rod form a four-bar mechanism.

2. The connecting rod drive mechanism for a water discharge valve according to claim 1, wherein the transmission part is located between the drive part and the turning part and forms a turning connection with the first stage connecting rod, the transmission part is provided with an elongated hole, and an end of the first stage connecting rod is provided with a rotating shaft which rotates and slides in the elongated hole; or, the end of the first stage connecting rod is provided with an elongated hole, and the transmission part is provided with a rotating shaft which rotates and slides in the elongated hole.

3. The connecting rod drive mechanism for a water discharge valve according to claim 2, wherein the mechanism further comprises a drive unit, and the drive unit is linked with the first stage connecting rod.

4. A water discharge valve, comprising an initiation assembly for controlling the opening and closing of the water discharge valve, and the connecting rod drive mechanism for a water discharge valve according to claim 2, wherein the connecting rod drive mechanism drives the initiation assembly to control the water discharge valve to be opened and discharge water, and the base is arranged on one side of the initiation assembly of the water discharge valve.

5. The connecting rod drive mechanism for a water discharge valve according to claim 1, wherein the base is detachably fixed on one side of the water discharge valve.

6. The connecting rod drive mechanism for a water discharge valve according to claim 5, wherein the mechanism further comprises a drive unit, and the drive unit is linked with the first stage connecting rod.

7. A water discharge valve, comprising an initiation assembly for controlling the opening and closing of the water discharge valve, and the connecting rod drive mechanism for a water discharge valve according to claim 5, wherein the connecting rod drive mechanism drives the initiation assembly to control the water discharge valve to be opened and discharge water, and the base is arranged on one side of the initiation assembly of the water discharge valve.

8. The connecting rod drive mechanism for a water discharge valve according to claim 1, wherein the base is provided with a fixing part fixedly connected with the water discharge valve, the fixing part has an adjusting structure, and the fixing part is adjustably fixed on the water discharge valve through the adjusting structure.

9. The connecting rod drive mechanism for a water discharge valve according to claim 8, wherein the mechanism further comprises a drive unit, and the drive unit is linked with the first stage connecting rod.

10. A water discharge valve, comprising an initiation assembly for controlling the opening and closing of the water discharge valve, and the connecting rod drive mechanism for a water discharge valve according to claim 8, wherein the connecting rod drive mechanism drives the initiation assembly to control the water discharge valve to be opened and discharge water, and the base is arranged on one side of the initiation assembly of the water discharge valve.

11. The connecting rod drive mechanism for a water discharge valve according to claim 1, wherein the base is fixed on an overflow pipe of the water discharge valve or a switch body of the water discharge valve or a valve body of the water discharge valve.

12. The connecting rod drive mechanism for a water discharge valve according to claim 11, wherein the mechanism further comprises a drive unit, and the drive unit is linked with the first stage connecting rod.

13. A water discharge valve, comprising an initiation assembly for controlling the opening and closing of the water discharge valve, and the connecting rod drive mechanism for a water discharge valve according to claim 11, wherein the connecting rod drive mechanism drives the initiation assembly to control the water discharge valve to be opened and discharge water, and the base is arranged on one side of the initiation assembly of the water discharge valve.

14. The connecting rod drive mechanism for a water discharge valve according to claim 1, wherein the mechanism further comprises a drive unit, and the drive unit is linked with the first stage connecting rod.

15. The connecting rod drive mechanism for a water discharge valve according to claim 14, wherein the drive unit uses motor driving.

16. The connecting rod drive mechanism for a water discharge valve according to claim 14, wherein the drive unit uses fluid driving, and comprises a fluid driving assembly, the fluid driving assembly comprises a pump, a cylinder/ elastic bladder and a piston, and when the pump is opened, the pump delivers working fluid to the cylinder/elastic bladder to drive the piston, which in turn drives the first stage connecting rod.

17. A water discharge valve, comprising an initiation assembly for controlling the opening and closing of the water discharge valve, and the connecting rod drive mechanism for a water discharge valve according to claim 1, wherein the connecting rod drive mechanism drives the initiation assembly to control the water discharge valve to be opened and discharge water, and the base is arranged on one side of the initiation assembly of the water discharge valve.

* * * * *